(12) United States Patent
Yang et al.

(10) Patent No.: US 11,391,411 B2
(45) Date of Patent: Jul. 19, 2022

(54) BRACKET STRUCTURE

(71) Applicant: Wistron NeWeb Corp., Hsinchu (TW)

(72) Inventors: Lan-Chun Yang, Hsinchu (TW);
Yi-Chieh Lin, Hsinchu (TW);
Ming-Hung Hung, Hsinchu (TW);
Chun-Wei Wang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 17/010,200

(22) Filed: Sep. 2, 2020

(65) Prior Publication Data
US 2021/0148506 A1    May 20, 2021

(30) Foreign Application Priority Data

Nov. 19, 2019   (TW) .................................. 108141907

(51) Int. Cl.
*F16M 13/00* (2006.01)
*F16M 11/04* (2006.01)
*F16M 11/10* (2006.01)

(52) U.S. Cl.
CPC ........ *F16M 13/005* (2013.01); *F16M 11/046* (2013.01); *F16M 11/10* (2013.01); *F16M 2200/025* (2013.01); *F16M 2200/066* (2013.01)

(58) Field of Classification Search
CPC .... F16M 13/005; F16M 11/046; F16M 11/10; F16M 2200/025; F16M 2200/066; H01Q 1/125

USPC ................................. 248/447.1, 48.2, 276.1
See application file for complete search history.

(56) References Cited

U.S. PATENT DOCUMENTS

| | | | | | |
|---|---|---|---|---|---|
| 2,733,030 | A | * | 1/1956 | Hawthorne | .......... H01Q 1/1221 248/314 |
| 6,264,152 | B1 | * | 7/2001 | Bloch | .................. F16M 11/126 343/882 |
| 6,315,259 | B1 | * | 11/2001 | Kolb | ...................... F16M 13/02 248/278.1 |

(Continued)

FOREIGN PATENT DOCUMENTS

| | | |
|---|---|---|
| DE | 20 2006 000 993 U1 | 3/2006 |
| TW | M278820 U | 10/2005 |

*Primary Examiner* — Muhammad Ijaz
(74) *Attorney, Agent, or Firm* — McClure, Qualey & Rodack, LLP

(57) ABSTRACT

A bracket structure is provided. The bracket structure includes a base, a connection pipe and at least one cascade member. The base includes a base body, a first connection protrusion and a second connection protrusion. The first connection protrusion and the second connection protrusion are affixed to the base body. The first connection protrusion includes a first contact surface. The second connection protrusion includes a second contact surface. The first contact surface faces the second contact surface. The connection pipe includes an extending section, a fitting section and a pivot section. The cascade member pivots on the first connection protrusion, the pivot section and the second connection protrusion. The pivot section includes a first abutting surface and a second abutting surface. The first abutting surface forms a surface-to-surface contact with the first contact surface. The second abutting surface forms a surface-to-surface contact with the second contact surface.

15 Claims, 9 Drawing Sheets

(56) References Cited

U.S. PATENT DOCUMENTS

| | | | |
|---|---|---|---|
| 6,988,701 B1* | 1/2006 | Lin | G09F 17/00 |
| | | | 248/521 |
| 11,047,523 B1* | 6/2021 | Chang | G03B 17/561 |
| 2005/0205734 A1* | 9/2005 | Wang | F16M 13/02 |
| | | | 248/276.1 |
| 2006/0102822 A1* | 5/2006 | Liang | F16C 11/045 |
| | | | 248/514 |
| 2012/0132771 A1* | 5/2012 | Wang | F16M 11/2014 |
| | | | 248/278.1 |
| 2016/0037762 A1* | 2/2016 | Thomas | A01K 97/10 |
| | | | 248/515 |

\* cited by examiner

BRACKET STRUCTURE

CROSS REFERENCE TO RELATED APPLICATIONS

This Application claims priority of Taiwan Patent Application No. 108141907, filed on Nov. 19, 2019, the entirety of which is incorporated by reference herein.

BACKGROUND OF THE INVENTION

Field of the Invention

The present invention relates to a bracket structure, and in particular to a bracket structure with improved load capacity.

Description of the Related Art

A conventional wireless transmission apparatus includes a wireless transmission device and a bracket structure. The wireless transmission device is disposed on one end of the bracket structure. The bracket structure includes a base and a connection pipe. The connection pipe connects to the base and the transmission device. The orientation of the connection pipe relative to the base can be adjusted to achieve the best transmission orientation. When the best transmission orientation is identified, the orientation of the connection pipe relative to the base must be fixed. However, the wireless transmission device has considerable weight, and the conventional connection pipe is a circular pipe. When the conventional connection pipe is affixed to the base, the static friction between the connection pipe and the base is too small, and the bracket structure cannot sufficiently support the wireless transmission device in the best transmission orientation.

BRIEF SUMMARY OF THE INVENTION

Embodiments of the invention are provided to address the aforementioned difficulty.

In one embodiment, a bracket structure is provided. The bracket structure includes a base, a connection pipe and at least one cascade member. The base includes a base body, a first connection protrusion and a second connection protrusion. The first connection protrusion and the second connection protrusion are affixed to the base body. The first connection protrusion includes a first contact surface. The second connection protrusion includes a second contact surface. The first contact surface faces the second contact surface. The connection pipe includes an extending section, a fitting section and a pivot section. The fitting section is located between the pivot section and the extending section. The cascade member pivots on the first connection protrusion, the pivot section and the second connection protrusion. The pivot section includes a first abutting surface and a second abutting surface. The first abutting surface is opposite the second abutting surface. The first abutting surface forms a surface-to-surface contact with the first contact surface. The second abutting surface forms a surface-to-surface contact with the second contact surface. The fitting section is adapted to abut the first connection protrusion and the second connection protrusion simultaneously. The pivot section comprises a pivot section diameter between the first abutting surface and the second abutting surface. The fitting section comprises a fitting section diameter. The fitting section diameter is greater than the pivot section diameter.

In another embodiment, a bracket structure is provided. The bracket structure includes a base, a connection pipe, at least one cascade member, a first positioning member, a second positioning member, and an elastic element. The base includes a base body, a first connection protrusion and a second connection protrusion. The first connection protrusion and the second connection protrusion are affixed to the base body. The connection pipe comprises a pivot section. The cascade member pivots on the first connection protrusion, the pivot section and the second connection protrusion. The first positioning member includes a plurality of first teeth. The second positioning member includes a plurality of second teeth. The elastic element is sandwiched between the first positioning member and the second positioning member. The first positioning member is affixed to the base. The second positioning member is affixed to the connection pipe. In a fastening state, the cascade member provides a fastening force to the first connection protrusion and the second connection protrusion, and each first tooth is wedged to a second tooth. In an adjustment state, the fastening force of the cascade member is released, the elastic element separates the first teeth from the second teeth, and the first positioning member is adapted to be rotated relative to the second positioning member.

In one embodiment, a wireless transmission apparatus is provided. The wireless transmission apparatus includes a wireless transmission device and a bracket structure. The bracket structure includes a base, a connection pipe and at least one cascade member. The base includes a base body, a first connection protrusion and a second connection protrusion. The first connection protrusion and the second connection protrusion are affixed to the base body. The first connection protrusion includes a first contact surface. The second connection protrusion includes a second contact surface. The first contact surface faces the second contact surface. The connection pipe includes an extending section, a fitting section and a pivot section. The fitting section is located between the pivot section and the extending section. The wireless transmission device is connected to the extending section. The cascade member pivots on the first connection protrusion, the pivot section and the second connection protrusion. The pivot section includes a first abutting surface and a second abutting surface. The first abutting surface is opposite the second abutting surface. The first abutting surface forms a surface-to-surface contact with the first contact surface. The second abutting surface forms a surface-to-surface contact with the second contact surface. The fitting section is adapted to abut the first connection protrusion and the second connection protrusion simultaneously. The pivot section comprises a pivot section diameter between the first abutting surface and the second abutting surface. The fitting section comprises a fitting section diameter. The fitting section diameter is greater than the pivot section diameter.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
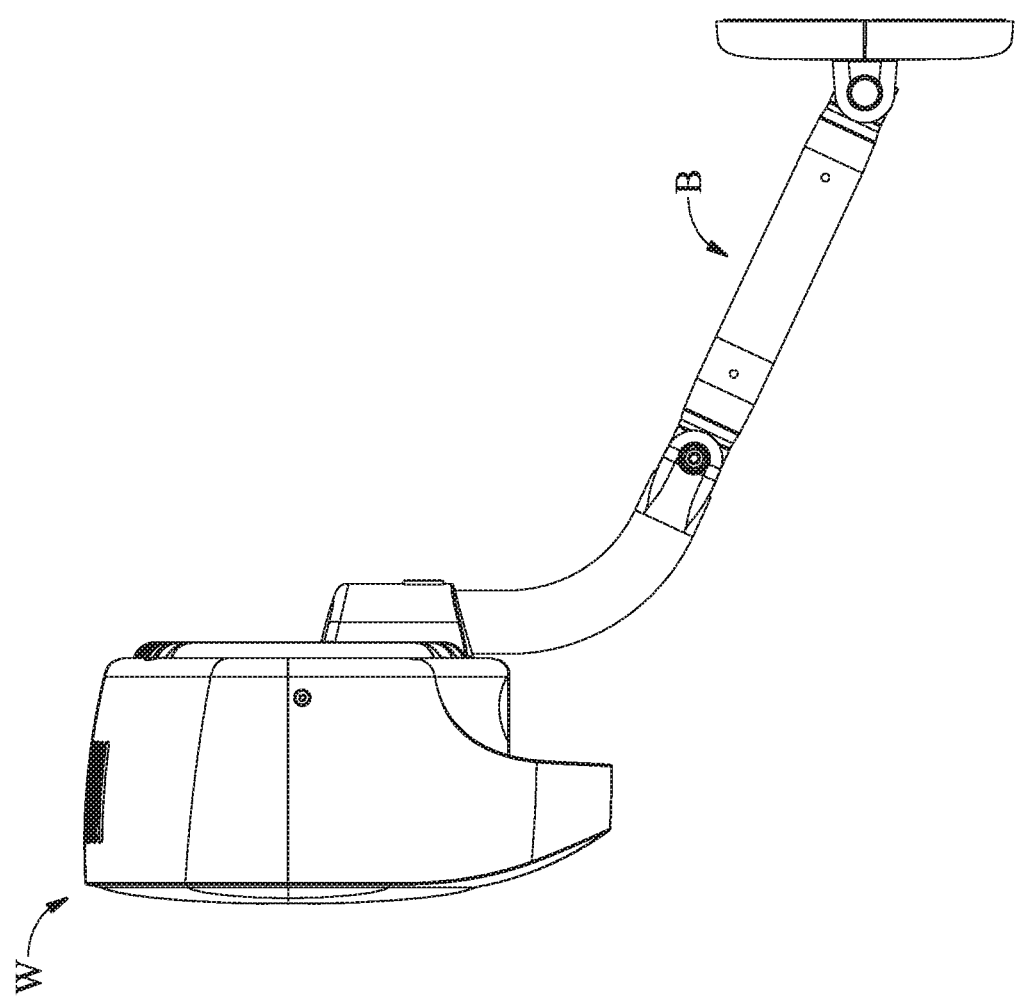
FIG. 1 shows a wireless transmission apparatus of an embodiment of the invention.

FIG. 1 shows a wireless transmission apparatus of an embodiment of the invention. With reference to FIG. 1, the wireless transmission apparatus of the embodiment of the invention includes a wireless transmission device W and a bracket structure B.

Figure 2:
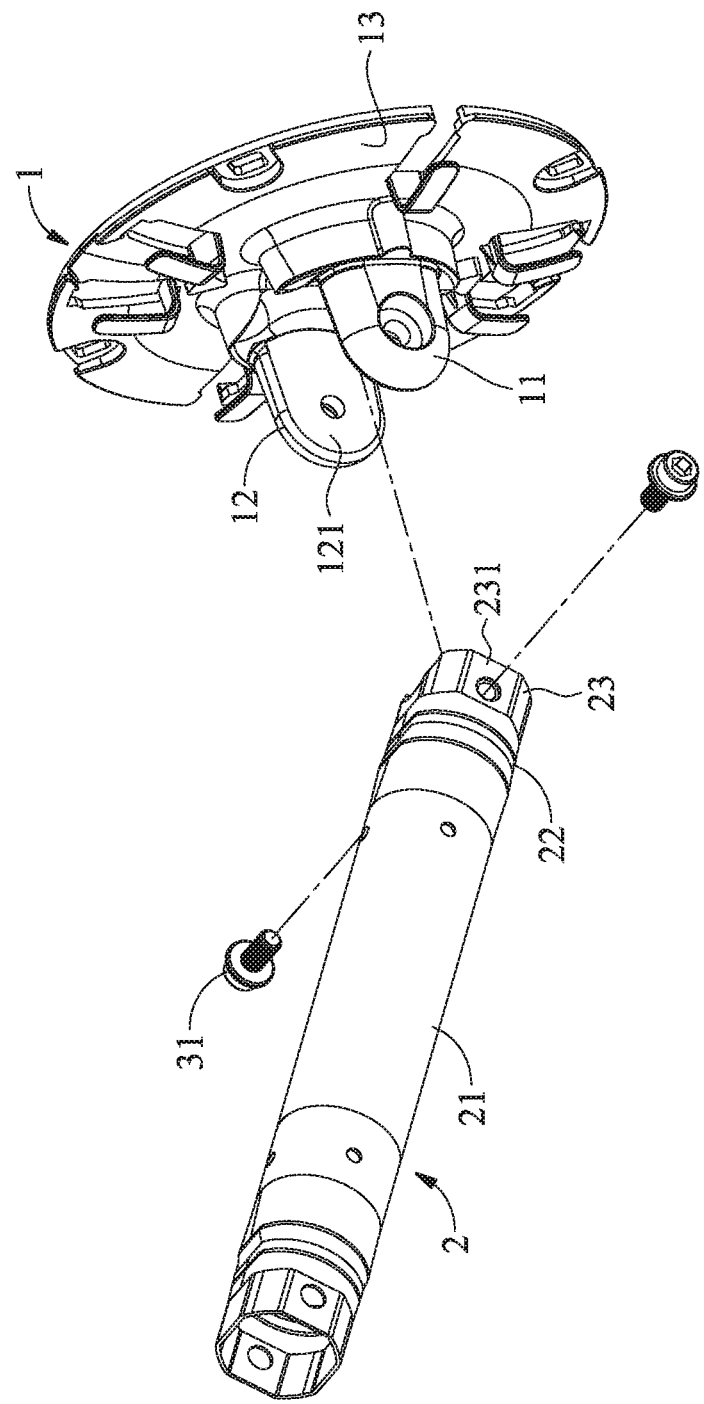
FIG. 2 is an exploded view of a bracket structure of a first embodiment of the invention.
Figure 3A:
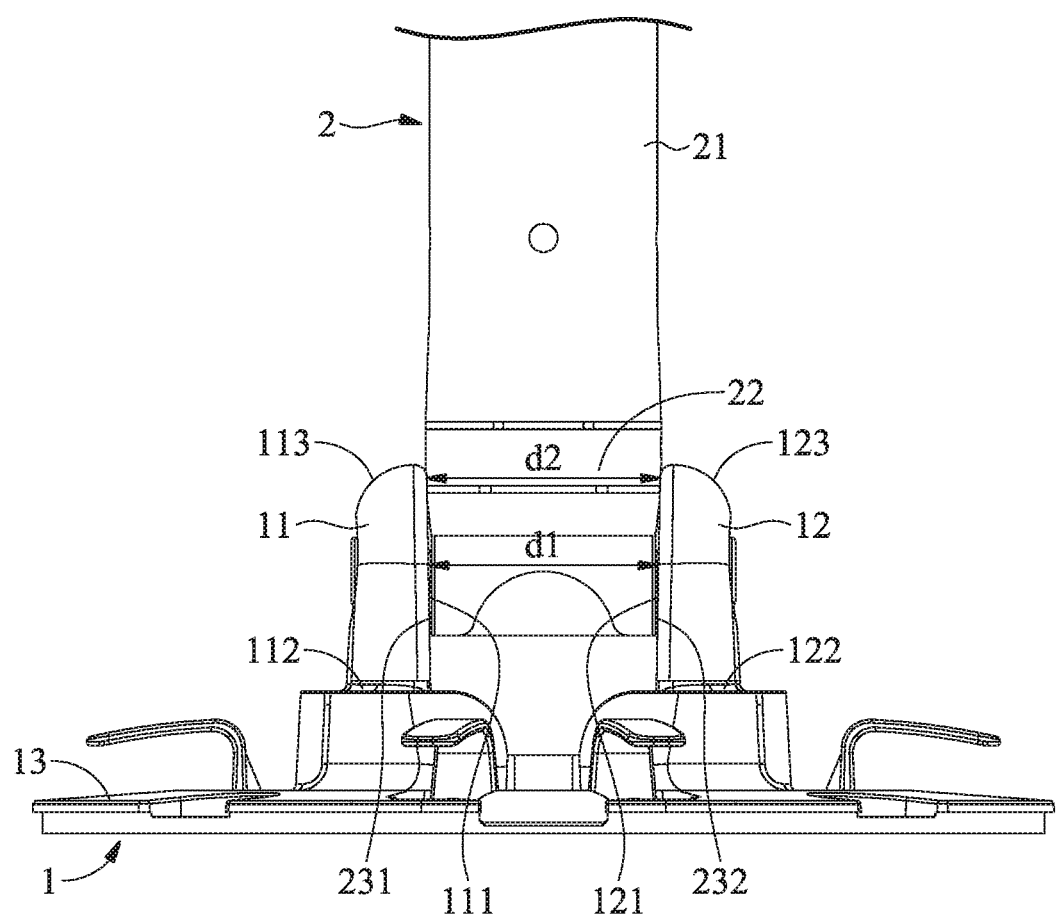
FIG. 3A is an assembled view of the bracket structure of the first embodiment of the invention.
Figure 3B:
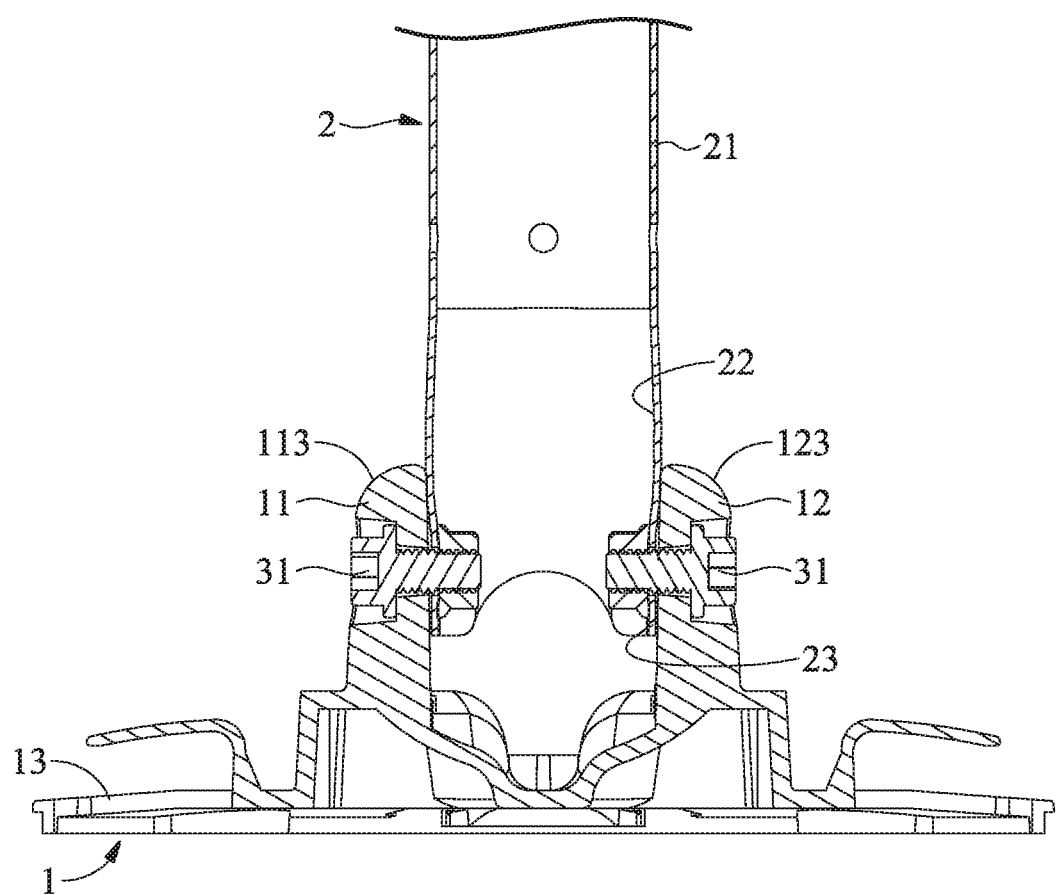
FIG. 3B is a cross sectional view of the bracket structure of the first embodiment of the invention.

FIG. 2 is an exploded view of the bracket structure of a first embodiment of the invention. FIG. 3A is an assembled view of the bracket structure of the first embodiment of the invention. FIG. 3B is a cross sectional view of the bracket structure of the first embodiment of the invention. With reference to FIGS. 2, 3A and 3B, in the first embodiment, the bracket structure B1 includes a base 1, a connection pipe 2 and at least one cascade member 31. The base 1 includes a base body 13, a first connection protrusion 11 and a second connection protrusion 12. The first connection protrusion 11 and the second connection protrusion 12 are affixed to the base body 13. The first connection protrusion 11 includes a first contact surface 111. The second connection protrusion 12 includes a second contact surface 121. The first contact surface 111 faces the second contact surface 121. The connection pipe 2 includes an extending section 21, a fitting section 22 and a pivot section 23. The fitting section 22 is located between the pivot section 23 and the extending section 21. The wireless transmission device W can be directly or indirectly connected to the extending section 21. The cascade member 31 pivots on the first connection protrusion 11, the pivot section 23 and the second connection protrusion 12. The pivot section 23 includes a first abutting surface 231 and a second abutting surface 232. The first abutting surface 231 is opposite the second abutting surface 232. The first abutting surface 231 forms a surface-to-surface contact with the first contact surface 111. The second abutting surface 232 forms a surface-to-surface contact with the second contact surface 121. The fitting section 22 is adapted to abut the first connection protrusion 11 and the second connection protrusion 12 simultaneously. The pivot section 23 comprises a pivot section diameter d1 between the first abutting surface 231 and the second abutting surface 232. The fitting section 22 comprises a fitting section diameter d2. The fitting section diameter d2 is greater than the pivot section diameter d1.

Figure 4A:
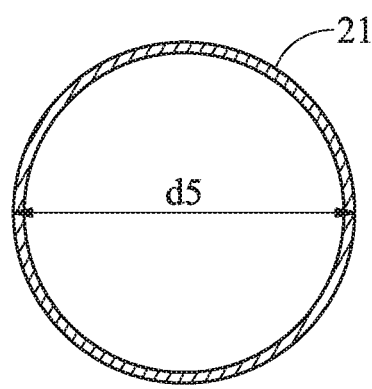
FIG. 4A is a cross sectional view of the extending section of the embodiment of the invention.

FIG. 4A is a cross sectional view of the extending section of the embodiment of the invention. With reference to FIG. 4A, in one embodiment, the cross section of the extending section 21 is oval or circular.

With reference to FIGS. 2, 3A, 3B and 4C, in one embodiment, the first abutting surface 231, the second abutting surface 232, the first contact surface 111 and the second contact surface 121 are planar surfaces. Therefore, the first abutting surface 231 can sufficiently contact the first contact surface 111, and the second abutting surface 232 can sufficiently contact the second contact surface 121.

With reference to FIGS. 3A and 3B, in one embodiment, the first connection protrusion 11 comprises a first affixed end 112 and a first free end 113. The second connection protrusion 12 comprises a second affixed end 122 and a second free end 123. The first affixed end 112 and the second affixed end 122 are affixed to the base body 13. The first free end 113 and the second free end 123 are adapted to abut the fitting section 22.

Figure 3C:
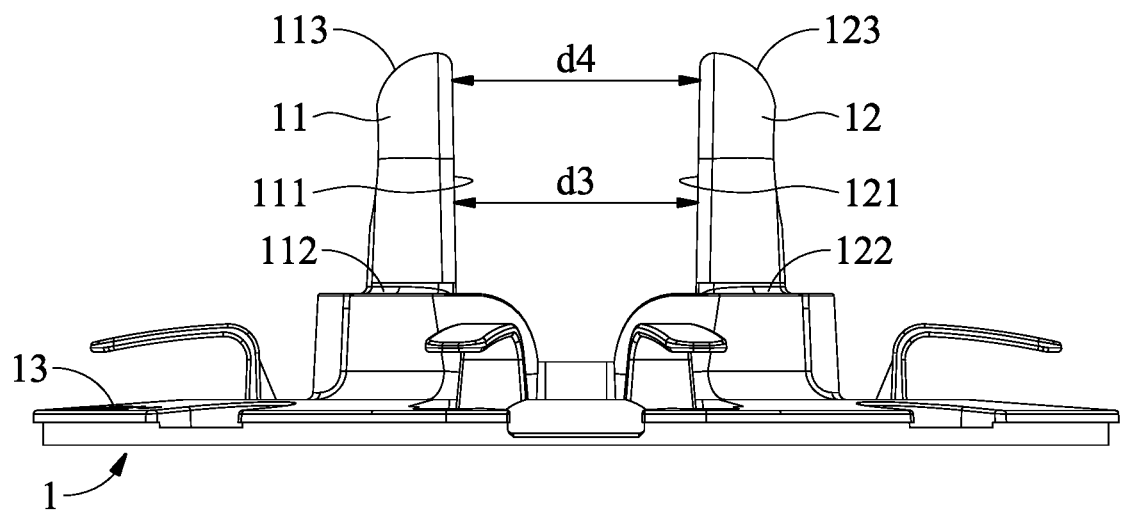
FIG. 3C shows the base of the embodiment before connected to the connection pipe.

FIG. 3C shows the base of the embodiment before connected to the connection pipe. With reference to FIGS. 3A and 3C, in one embodiment, before the base is connected to the connection pipe, a first gap d3 is formed between the first contact surface 111 (FIG. 3A) and the second contact surface 121 (FIG. 3A). A second gap d4 is formed between the first free end 113 and the second free end 123, and the second gap d4 is greater than the first gap d3. In one embodiment, the fitting section diameter d2 is greater than the second gap d4. Therefore, the base can sufficiently tight fit with the connection pipe.

Figure 3D:
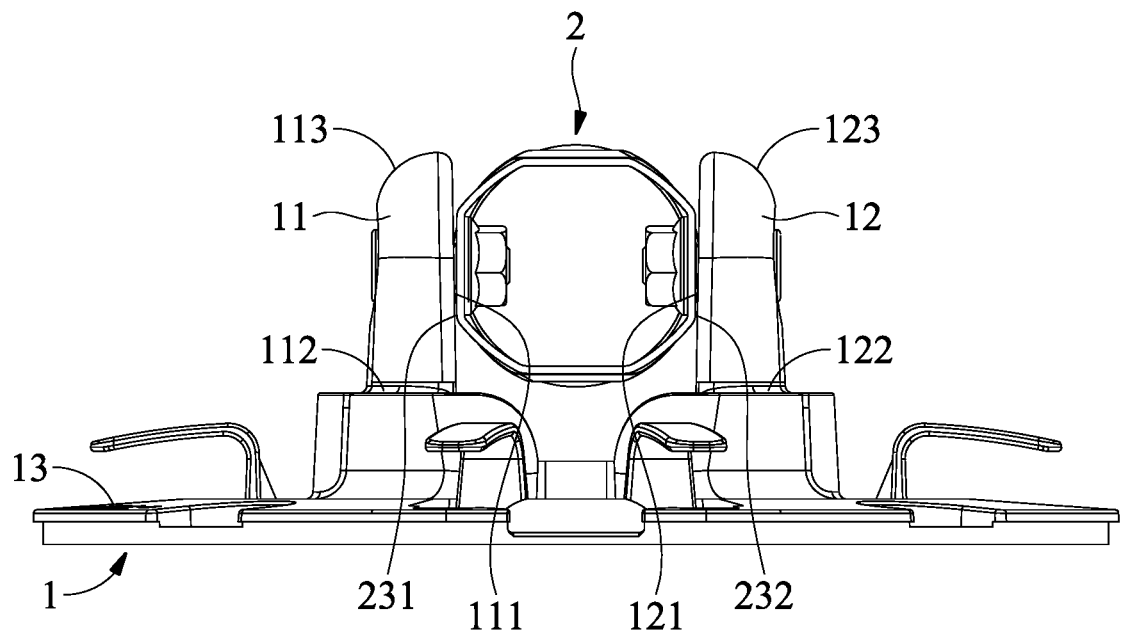
FIG. 3D is an assembled view of the bracket structure of the embodiment of the invention, wherein the extending direction of the connection pipe differs from the extending direction of the first connection protrusion and the second connection protrusion.

FIG. 3D is an assembled view of the bracket structure of the embodiment of the invention, wherein the extending direction of the connection pipe differs from the extending direction of the first connection protrusion and the second connection protrusion. With reference to FIGS. 3A and 3D, in the embodiment of the invention, the first abutting surface 231 sufficiently forms a surface-to-surface contact with the first contact surface 111. The second abutting surface 232 sufficiently forms a surface-to-surface contact with the second contact surface 121. Therefore, the friction force between base and the connection pipe is increased, and the load capacity of the bracket structure is increased. When the fitting section 22 tightly fits the first free end 113 and the second free end 123, the load capacity of the bracket structure is doubled relative to the conventional art.

In one embodiment, the fitting section 22 is not only utilized to fit the first free end 113 and the second free end 123. For example, when there is enough space between the first connection protrusion and the second connection protrusion, the fitting section 22 can tightly fit the first connection protrusion and the second connection protrusion in any orientation. The disclosure is not meant to restrict the invention.

Figure 4B:
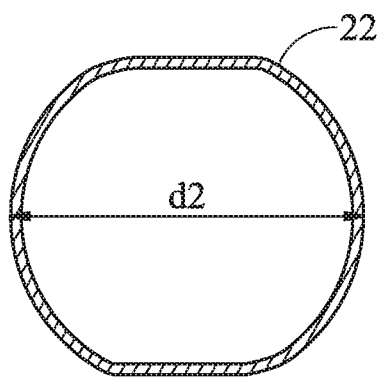
FIG. 4B is a cross sectional view of the fitting section of the embodiment of the invention.
Figure 4C:
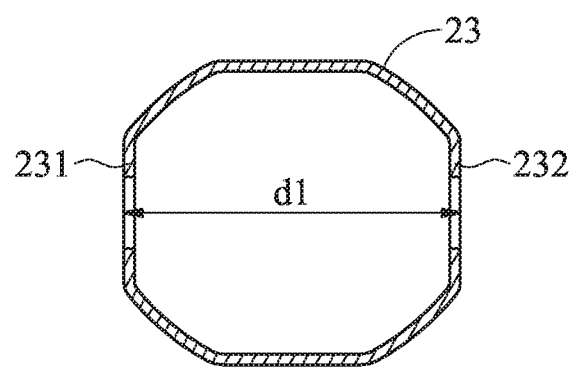
FIG. 4C is a cross sectional view of the pivot section of the embodiment of the invention.

FIG. 4B is a cross sectional view of the fitting section of the embodiment of the invention. FIG. 4C is a cross sectional view of the pivot section of the embodiment of the invention. With reference to FIGS. 2, 4A, 4B and 4C, in one embodiment, the connection pipe 2 is integrally formed. The fitting section 22 and the pivot section 23 are formed by punching, and the fitting section diameter d2 of the fitting section 22 is greater than an extending section diameter d5 of the extending section 21.

In the embodiment of the invention, the connection pipe of the embodiment of the invention can be achieved by punching the conventional connection pipe. Therefore, the connection pipe of the embodiment of the invention can provide improved load capacity with lower cost.

Figure 5:
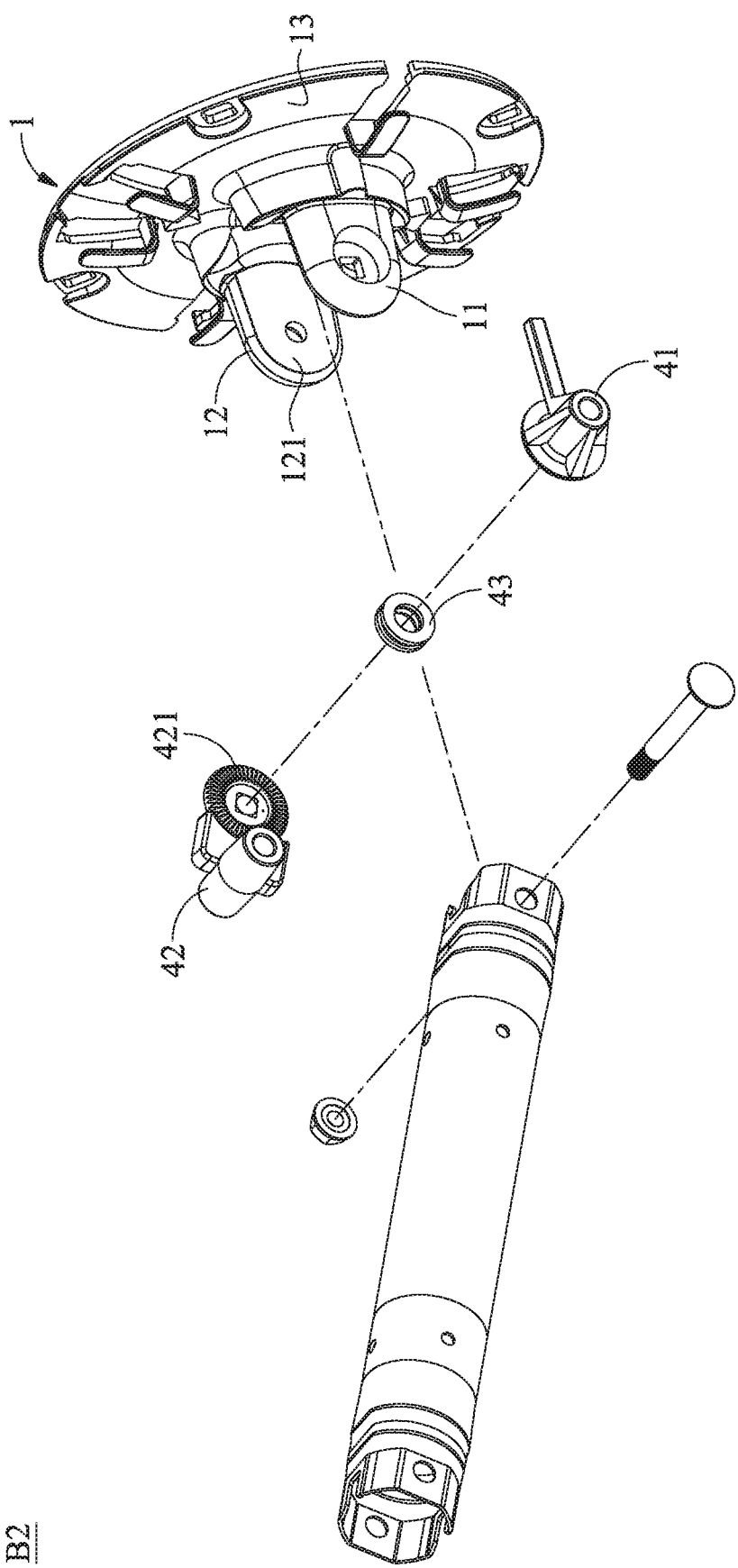
FIG. 5 shows a bracket structure of a second embodiment of the invention.

FIG. 5 shows a bracket structure of a second embodiment of the invention. With reference to FIG. 5, in the second embodiment, the bracket structure B2 further comprises an elastic element 43, a first positioning member 41 and a second positioning member 42. The first positioning member 41 comprises a plurality of first teeth 411. The second positioning member 42 comprises a plurality of second teeth 421. The elastic element 43 is sandwiched between the first positioning member 41 and the second positioning member 42. The first positioning member 41 is affixed to the base 13. The second positioning member 42 is affixed to the connection pipe 2.

Figure 6A:
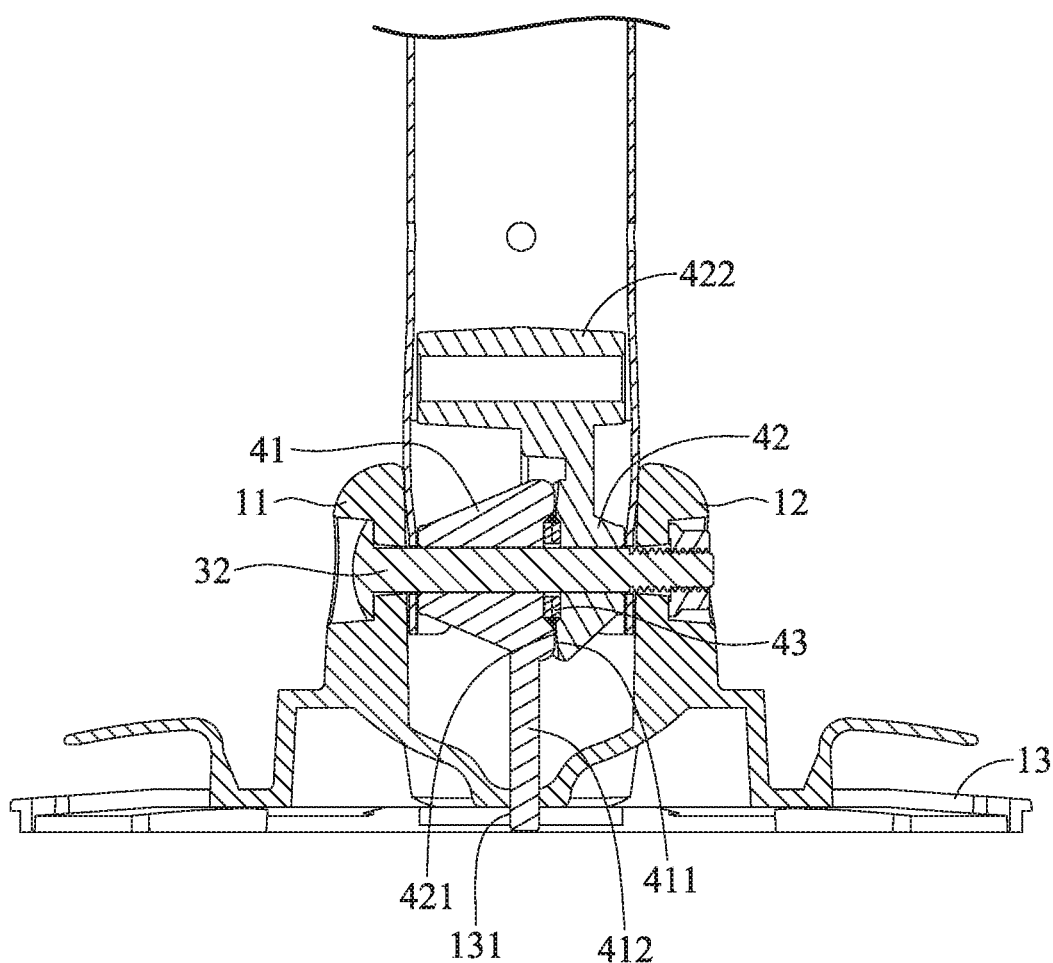
FIG. 6A shows the bracket structure of the second embodiment of the invention, wherein the bracket structure is in a fastening state.
Figure 6B:
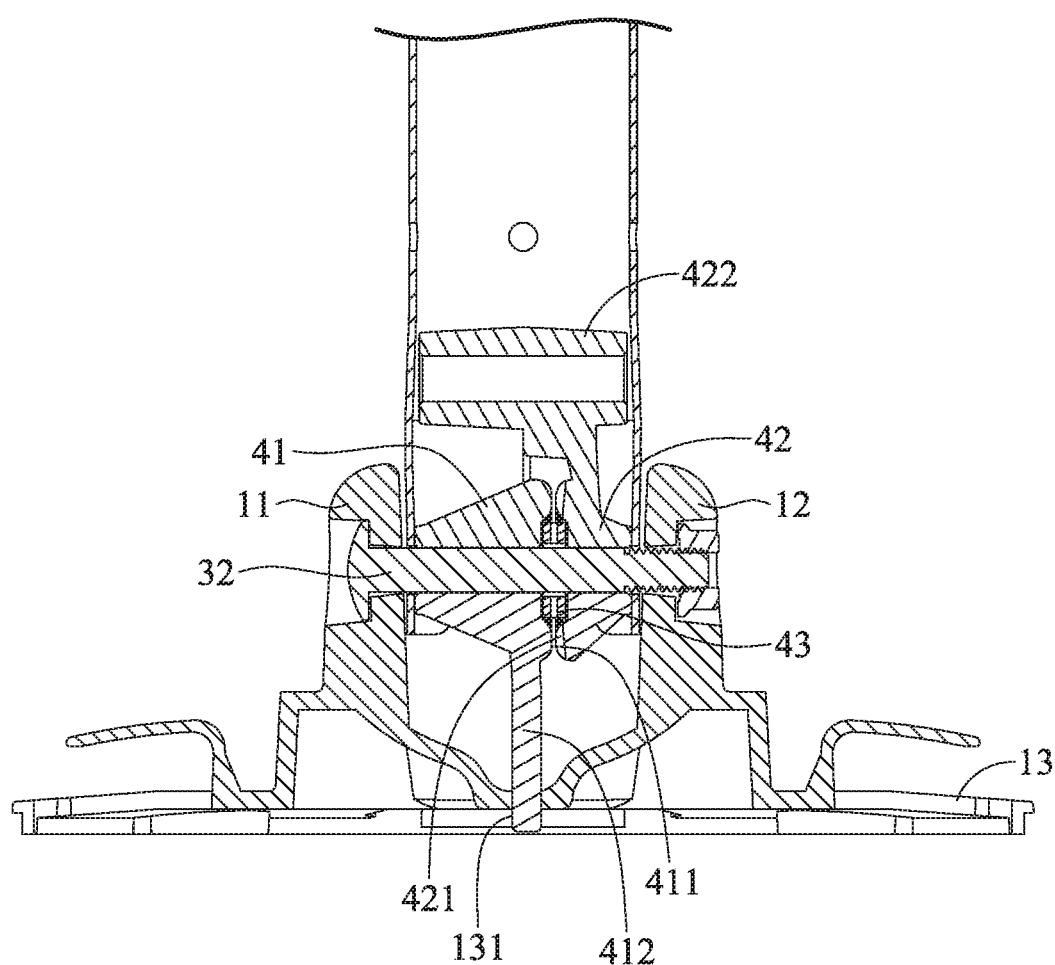
FIG. 6B shows the bracket structure of the second embodiment of the invention, wherein the bracket structure is in an adjustment state.

FIG. 6A shows the bracket structure of the second embodiment of the invention, wherein the bracket structure is in a fastening state. FIG. 6B shows the bracket structure of the second embodiment of the invention, wherein the bracket structure is in an adjustment state. With reference to FIGS. 6A and 6B, in the fastening state (FIG. 6A), the cascade member 32 provides a fastening force to the first connection protrusion 11 and the second connection protrusion 12, and each first tooth 411 is wedged to a second tooth 421. In the adjustment state (FIG. 6B), the fastening force of the cascade member 32 is released, the elastic element 43 separates the first teeth 411 from the second teeth 421, and the first positioning member 41 is adapted to be rotated relative to the second positioning member 42.

With reference to FIGS. 6A and 6B, in one embodiment, the first positioning member 41 comprises a first positioning post 412. The base body 13 comprises a positioning slot 131. The first positioning post 412 is inserted into the positioning slot 131. Since the first positioning post 412 is inserted into the positioning slot 131, the relative position of the first positioning member 41 to the base 1 is fixed.

With reference to FIGS. 6A and 6B, in one embodiment, the second positioning member 42 comprises a second positioning post 422. The second positioning post 422 is inserted into the connection pipe 2. The second positioning post 422 extends in the diametric direction of the connection pipe 2. Utilizing the second positioning post 422, the relative position of the second positioning member 42 to the connection pipe 2 is fixed.

In the second embodiment of the invention, by adjusting the fastening force of the cascade member, the bracket structure can be switched between the fastening state and the adjustment state. When the bracket structure is in the adjustment state, the connection pipe can be rotated relative to the base. When the bracket structure is in the fastening state, the relative orientation of the connection pipe to the base is fixed. The second embodiment of the invention can be utilized with the first embodiment of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bracket structure, comprising:
   a base, comprising a base body, a first connection protrusion and a second connection protrusion, wherein the first connection protrusion and the second connection protrusion are affixed to the base body, the first connection protrusion comprises a first contact surface, the second connection protrusion comprises a second contact surface, and the first contact surface faces the second contact surface;
   a connection pipe, wherein the connection pipe comprises an extending section, a fitting section and a pivot section, and the fitting section is located between the pivot section and the extending section, wherein the pivot section and the fitting section are located on different portions of the connection pipe;
   at least one cascade member, pivoting on the first connection protrusion, the pivot section and the second connection protrusion, wherein the pivot section comprises a first abutting surface and a second abutting surface, the first abutting surface is opposite the second abutting surface, the first abutting surface forms a surface-to-surface contact with the first contact surface, and the second abutting surface forms a surface-to-surface contact with the second contact surface,
   wherein the first connection protrusion comprises a first affixed end and a first free end, the second connection protrusion comprises a second affixed end and a second free end, the first affixed end and the second affixed end are affixed to the base body, and the first free end and the second free end are adapted to abut the fitting section,
   wherein the fitting section is adapted to tightly fit the first free end and the second free end simultaneously, the pivot section comprises a pivot section diameter between the first abutting surface and the second abutting surface, the fitting section comprises a fitting section diameter, and the fitting section diameter is greater than the pivot section diameter,
   wherein a first gap is formed between the first contact surface and the second contact surface, a second gap is formed between the first free end and the second free end, and the second gap is greater than the first gap.

2. The bracket structure as claimed in claim 1, wherein a cross section of the extending section is oval or circular.

3. The bracket structure as claimed in claim 2, wherein the first abutting surface, the second abutting surface, the first contact surface and the second contact surface are planar surfaces.

4. The bracket structure as claimed in claim 1, further comprising an elastic element, a first positioning member and a second positioning member, the first positioning member comprises a plurality of first teeth, the second positioning member comprises a plurality of second teeth, the elastic element is sandwiched between the first positioning member and the second positioning member, the first positioning member is affixed to the base, the second positioning member is affixed to the connection pipe, wherein in a fastening state, the cascade member provides a fastening force to the first connection protrusion and the second connection protrusion, and each first tooth is wedged to a second tooth, wherein in an adjustment state, the fastening force of the cascade member is released, the elastic element separates the first teeth from the second teeth, and the first positioning member is adapted to be rotated relative to the second positioning member.

5. The bracket structure as claimed in claim 4, wherein the first positioning member comprises a first positioning post, the base body comprises a positioning slot, and the first positioning post is inserted into the positioning slot.

6. The bracket structure as claimed in claim 4, wherein the second positioning member comprises a second positioning post, the second positioning post is inserted into the connection pipe, and the second positioning post extends in a diametric direction of the connection pipe.

7. The bracket structure as claimed in claim 1, wherein the connection pipe is integrally formed.

8. The bracket structure as claimed in claim 7, wherein the fitting section and the pivot section are formed by punching, and the fitting section diameter of the fitting section is greater than an extending section diameter of the extending section.

9. The bracket structure as claimed in claim 1, wherein the pivot section and the fitting section constitute a tapered cross section.

10. A wireless transmission apparatus, comprising:
a wireless transmission device; and
a bracket structure, comprising:
a base, comprising a base body, a first connection protrusion and a second connection protrusion, wherein the first connection protrusion and the second connection protrusion are affixed to the base body, the first connection protrusion comprises a first contact surface, the second connection protrusion comprises a second contact surface, and the first contact surface faces the second contact surface;
a connection pipe, wherein the connection pipe comprises an extending section, a fitting section and a pivot section, and the fitting section is located between the pivot section and the extending section, wherein the wireless transmission device is connected to the extending section, wherein the pivot section and the fitting section are located on different portions of the connection pipe;
at least one cascade member, pivoting on the first connection protrusion, the pivot section and the second connection protrusion, wherein the pivot section comprises a first abutting surface and a second abutting surface, the first abutting surface is opposite the second abutting surface, the first abutting surface forms a surface-to-surface contact with the first contact surface, and the second abutting surface forms a surface-to-surface contact with the second contact surface,
wherein the first connection protrusion comprises a first affixed end and a first free end, the second connection protrusion comprises a second affixed end and a second free end, the first affixed end and the second affixed end are affixed to the base body, and the first free end and the second free end are adapted to abut the fitting section,
wherein the fitting section is adapted to tightly fit the first free end and the second free end simultaneously, the pivot section comprises a pivot section diameter between the first abutting surface and the second abutting surface, the fitting section comprises a fitting section diameter, and the fitting section diameter is greater than the pivot section diameter,
wherein a first gap is formed between the first contact surface and the second contact surface, a second gap is formed between the first free end and the second free end, and the second gap is greater than the first gap.

11. The wireless transmission apparatus as claimed in claim 10, wherein a cross section of the extending section is oval or circular.

12. The wireless transmission apparatus as claimed in claim 11, wherein the first abutting surface, the second abutting surface, the first contact surface and the second contact surface are planar surfaces.

13. The wireless transmission apparatus as claimed in claim 10, wherein the bracket structure further comprises an elastic element, a first positioning member and a second positioning member, the first positioning member comprises a plurality of first teeth, the second positioning member comprises a plurality of second teeth, the elastic element is sandwiched between the first positioning member and the second positioning member, the first positioning member is affixed to the base, the second positioning member is affixed to the connection pipe, wherein in a fastening state, the cascade member provides a fastening force to the first connection protrusion and the second connection protrusion, and each first tooth is wedged to a second tooth, wherein in an adjustment state, the fastening force of the cascade member is released, the elastic element separates the first teeth from the second teeth, and the first positioning member is adapted to be rotated relative to the second positioning member.

14. The wireless transmission apparatus as claimed in claim 13, wherein the first positioning member comprises a first positioning post, the base body comprises a positioning slot, and the first positioning post is inserted into the positioning slot, the second positioning member comprises a second positioning post, the second positioning post is inserted into the connection pipe, and the second positioning post extends in a diametric direction of the connection pipe.

15. A bracket structure, comprising:
a base, comprising a base body, a first connection protrusion and a second connection protrusion, wherein the first connection protrusion and the second connection protrusion are affixed to the base body, the first connection protrusion comprises a first contact surface, the second connection protrusion comprises a second contact surface, and the first contact surface faces the second contact surface;
a connection pipe, wherein the connection pipe comprises an extending section, a fitting section and a pivot section, and the fitting section is located between the pivot section and the extending section;
at least one cascade member, pivoting on the first connection protrusion, the pivot section and the second connection protrusion, wherein the pivot section comprises a first abutting surface and a second abutting surface, the first abutting surface is opposite the second abutting surface, the first abutting surface forms a surface-to-surface contact with the first contact surface, and the second abutting surface forms a surface-to-surface contact with the second contact surface,
wherein the first connection protrusion comprises a first affixed end and a first free end, the second connection protrusion comprises a second affixed end and a second free end, the first affixed end and the second affixed end are affixed to the base body, and the first free end and the second free end are adapted to abut the fitting section, wherein the fitting section is adapted to tightly fit the first free end and the second free end simultaneously, the pivot section comprises a pivot section diameter between the first abutting surface and the second abutting surface, the fitting section comprises a fitting section diameter, and the fitting section diameter is greater than the pivot section diameter;

an elastic element;

a first positioning member; and a second positioning member, wherein the first positioning member comprises a plurality of first teeth, the second positioning member comprises a plurality of second teeth, the elastic element is sandwiched between the first positioning member and the second positioning member, the first positioning member is affixed to the base, the second positioning member is affixed to the connection pipe, wherein in a fastening state, the cascade member provides a fastening force to the first connection protrusion and the second connection protrusion, and each first tooth is wedged to a second tooth, wherein in an adjustment state, the fastening force of the cascade member is released, the elastic element separates the first teeth from the second teeth, and the first positioning member is adapted to be rotated relative to the second positioning member.

* * * * *